(12) United States Patent
Schneider et al.

(10) Patent No.: US 6,943,509 B2
(45) Date of Patent: Sep. 13, 2005

(54) ROTOR SPEED CONTROL DEVICE AND METHOD

(75) Inventors: Harvey Schneider, Southbury, CT (US); David Michael Carson, Newtown, CT (US)

(73) Assignee: Kendro Laboratory Products, LP, Newton, CT (US)

( * ) Notice: Subject to any disclaimer, the term of this patent is extended or adjusted under 35 U.S.C. 154(b) by 0 days.

(21) Appl. No.: 10/615,295

(22) Filed: Jul. 9, 2003

(65) Prior Publication Data

US 2005/0007046 A1 Jan. 13, 2005

(51) Int. Cl.[7] ............................................. H02P 5/00
(52) U.S. Cl. .................. 318/268; 318/432; 318/434; 73/865.9; 494/7; 494/8
(58) Field of Search ................. 318/375, 432, 318/433, 434, 729, 759, 472, 700; 494/7–12, 37; 700/273, 275; 388/809, 811, 844; 702/41, 132; 73/1.37, 865.9

(56) References Cited

U.S. PATENT DOCUMENTS

| | | | |
|---|---|---|---|
| 4,700,117 A | * 10/1987 | Giebeler et al. | 388/814 |
| 4,827,197 A | * 5/1989 | Giebeler | 318/3 |
| 4,903,191 A | * 2/1990 | Fries | 700/3 |
| 5,235,864 A | * 8/1993 | Rosselli et al. | 73/865.9 |
| 5,431,620 A | 7/1995 | Schenck et al. | 494/7 |
| 5,467,001 A | 11/1995 | Iwashita | 318/434 |
| 5,509,881 A | 4/1996 | Sharples | 494/7 |
| 5,600,076 A | 2/1997 | Fleming et al. | 73/865.9 |
| 5,650,578 A | 7/1997 | Fleming et al. | 73/865.9 |
| 5,800,331 A | 9/1998 | Song | 494/7 |
| 5,837,879 A | 11/1998 | Zick | 73/1.37 |
| 6,204,627 B1 | 3/2001 | Watanabe et al. | 318/729 |
| 6,205,405 B1 | 3/2001 | Pouvreau | 702/41 |
| 6,368,265 B1 | 4/2002 | Barkus et al. | 494/8 |
| 6,679,820 B2 | 1/2004 | Barkus et al. | 494/8 |
| 6,747,427 B1 | 6/2004 | Carson | 318/432 |
| 2004/0033878 A1 | 2/2004 | Carson et al. | 494/7 |

* cited by examiner

*Primary Examiner*—Paul Ip
(74) *Attorney, Agent, or Firm*—Baker & Hostetler LLP

(57) ABSTRACT

Kinetic energy of a rotor is substantially prevented from exceeding a predetermined amount of kinetic energy by determining a first kinetic energy of the rotor spinning at a first rotational velocity and determining whether the first kinetic energy exceeds the predetermined amount of kinetic energy. In addition, torque being applied to the rotor is modulated in response to the first kinetic energy exceeding the predetermined amount of kinetic energy. In this manner, the rotor is spun at a relatively slower rotational velocity than the first rotational velocity.

15 Claims, 4 Drawing Sheets

ROTOR SPEED CONTROL DEVICE AND METHOD

FIELD OF THE INVENTION

The present invention generally relates to a rotor speed controlling device and method. More particularly, the present invention pertains to a device and method of controlling rotor speed as a result of applied torque inconsistencies.

BACKGROUND OF THE INVENTION

It is generally known that centrifuges are employed to apply centripetal force on to samples and thereby precipitate, separate or fractionate constituents within the samples. Within the centrifuge, a rotor is generally configured to contain the sample. The rotor is typically spun by a motor. That is, the motor applies torque in a direction that is perpendicular to the axis of the rotor to modulate the rotational velocity or speed of the rotor and thereby generate centripetal force. In addition to the generation of centripetal force, the torque applied to the rotor is converted into kinetic energy as the inertial mass of the rotor gains speed.

In the event of a failure of the rotor, the kinetic energy may cause undesirable consequences to personnel and/or property in the vicinity. Therefore, centrifuges typically include a containment system configured to contain and/or dissipate eject a having a certain amount of energy. However, due to the fact that the kinetic energy of the rotor increases as a factor of the rotational velocity squared, it may be undesirably expensive to produce a containment system capable of containing all conceivable amounts of energy a failed rotor may impart.

To facilitate the prevention of a failure of the rotor, rotors typically include a maximum rated speed corresponding to a theoretical and/or empirically derived maximum safe operating speed of the rotor. In addition, there are various conventional rotor identification protocols configured to substantially prevent rotors from being spun at a rate greater than their corresponding maximum rated speed. However, there is not currently a system configured to prevent the kinetic energy of a rotor from exceeding an amount of kinetic energy that the containment system is configured to contain.

Accordingly, it is desirable to provide a method and apparatus capable of overcoming the disadvantages described herein at least to some extent.

SUMMARY OF THE INVENTION

The foregoing needs are met, to a great extent, by the present invention, wherein in one respect an apparatus and method is provided that in some embodiments substantially prevents an amount of kinetic energy of a rotor spinning in a centrifuge from exceeding a predetermined amount of kinetic energy.

An embodiment of the present invention pertains to an apparatus for controlling rotational speed of a motor operable to apply torque to a rotor within a centrifuge configured to contain a predetermined amount of kinetic energy ($KE_{pred}$) resulting from a failure of the rotor. In this apparatus, an acceleration rate and a deceleration rate of the rotor is determined by a processor. This processor is further configured to determine an amount of kinetic energy of the rotor at a set rotational speed ($KE_{ss}$) in response to the acceleration rate and the deceleration rate and the processor is further again configured to compare the $KE_{ss}$ to the $KE_{pred}$. In this manner, the processor is configured to substantially prevent the rotor from obtaining the set rotational speed in response to the $KE_{ss}$ exceeding the $KE_{pred}$.

Another embodiment of the present invention relates to a system for controlling rotational speed of a rotor within a centrifuge. This system includes a motor, controller, and speed sensor. The motor is operative to rotate the rotor. The controller is configured to modulate an amount of torque generated by the motor and thereby modulate the rotational speed of the rotor. The speed sensor is configured to sense the rotational speed of at least one of the motor and the rotor, and transmit the sensed rotational speed to the controller. In this regard, the controller is configured to determine an amount of kinetic energy associated with the rotor in response to the amount of torque and the sensed rotational speed. The controller is further configured to compare the amount of kinetic energy associated with the rotor to a predetermined amount of kinetic energy. Moreover, the controller is configured to reduce the rotational speed of the motor in response to the compared amount of kinetic energy associated with the rotor being greater than the predetermined amount of kinetic energy.

Yet another embodiment of the present invention pertains to an apparatus for substantially preventing kinetic energy of a rotor from exceeding a predetermined amount of kinetic energy. This apparatus includes a means for determining a first kinetic energy of the rotor spinning at a first rotational velocity, a means for determining whether the first kinetic energy exceeds the predetermined amount of kinetic energy, and a means for modulating torque being applied to the rotor in response to the first kinetic energy exceeding the predetermined amount of kinetic energy. In this manner, the rotor is spun at a relatively slower rotational velocity than the first rotational velocity.

Yet another embodiment of the present invention relates to a method of substantially preventing kinetic energy of a rotor from exceeding a predetermined amount of kinetic energy. In this method, a first kinetic energy of the rotor spinning at a first rotational velocity is determined and it is determined whether the first kinetic energy exceeds the predetermined amount of kinetic energy. Torque being applied to the rotor is modulated in response to the first kinetic energy exceeding the predetermined amount of kinetic energy. In this manner, the rotor is spun at a relatively slower rotational velocity than the first rotational velocity.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

At least some embodiments of the present invention provide an apparatus that is configured to substantially prevent an amount of kinetic energy of a rotor spinning in a centrifuge from exceeding a predetermined amount of kinetic energy. Other embodiments in accordance with the present invention provide a method of substantially preventing an amount of kinetic energy of a rotor spinning in a centrifuge from exceeding a predetermined amount of kinetic energy. At least one advantage that various embodiments of the invention include is essentially preventing the kinetic energy of a rotor spinning in a centrifuge from exceeding an amount of kinetic energy the centrifuge is configured to contain. In this manner, the various embodiments of the invention are configured to reduce the likelihood of undesirable consequences occurring as a result of a failure of the rotor.

Figure 1:
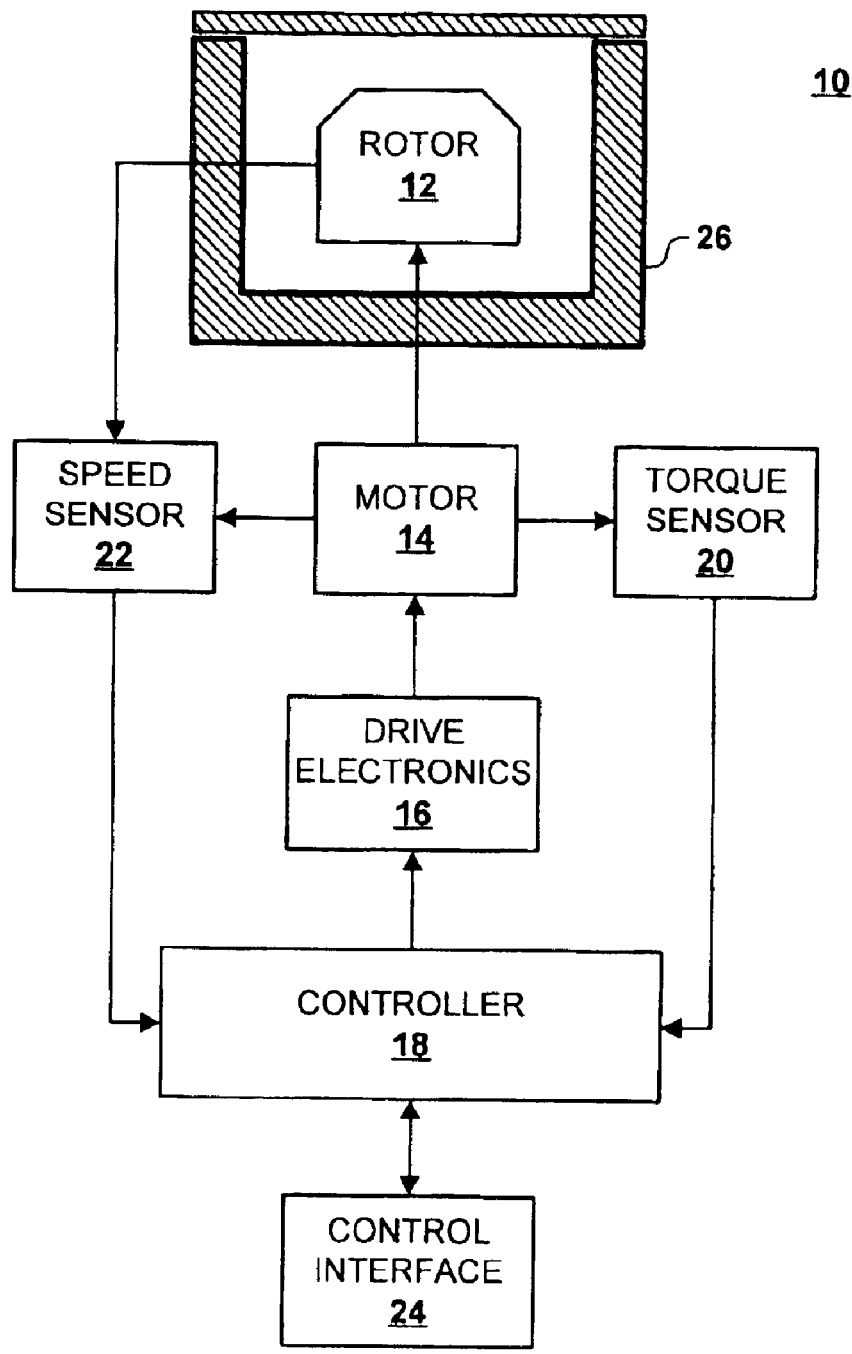
FIG. 1 is a block diagram of a centrifuge device according to an embodiment of the invention.

The invention will now be described with reference to the drawing figures, in which like reference numerals refer to like parts throughout. As shown in FIG. 1, a centrifuge 10 is configured to control the rotational velocity of a rotor 12. To impart torque in a direction perpendicular to the axis of rotation for the rotor 12, the centrifuge 10 includes a motor 14, drive electronics 16 and a controller 18. The motor 14 is modulated by the drive electronics 16 based upon signals received from the controller 18. For example, in response to pulse width modulation (PWM) and/or modulation of current being applied to the motor 14, the amount of torque generated by the motor 14 may be controlled. This torque may be applied to the rotor 12 from the motor 14 via any suitable manner such as, a drive shaft, coupling, linkage, gyro shaft, drive cone, and the like. To determine the amount of torque applied, the centrifuge 10 may include a torque sensor 20 configured to sense torque generated by the motor 14 and transmit measurements associated with this generated torque to the controller 18. For example, the torque sensor may include a magnetostrictive sensor configured to sense changes in magnetic permeability and/or lines of magnetic flux. Measurements associated with these sensed permeability and/or flux line changes may be relayed by the torque sensor 20 to the controller 18. However, it is within the scope of embodiments of the invention that the torque sensor 20 be subsumed within the motor 14. For example, the motor 14 may include a switched reluctance motor configured to forward measurements associated with generated toque to the controller 18. In additional, it is within the scope of various embodiments of the invention that the amount of torque applied may be determined in a variety of other manners. For example, the applied torque may be calculated based on a measured input current and predetermined motor torque characteristics. These predetermined motor torque characteristics may be derived empirically, provided by the manufacturer, etc. Furthermore, other examples of suitable motors include induction, brushless DC, and the like.

The drive electronics 16 are configured to modulate the motor 14 in response to signals from the controller 18. For example, the drive electronics may output PWM and/or current to the motor 14 in response to signals received from the controller 18. In this regard, the controller 18 is configured to determine and transmit these signals in response rotational velocity measurements and run parameters. The rotational velocity measurements may be sensed by a speed sensor 22. The speed sensor 22 may be configured to sense a rotational velocity or angular velocity associated with the rotor 12. For example, the speed sensor 22 may include a tachometer configured to directly sense the angular velocity of the drive shaft or various other components of the motor 14 and/or drive train. This sensed angular velocity may correlate to the angular velocity of the motor 14. However, it is within the scope of various embodiments of the invention that the speed sensor 22 is configured to directly sense the angular velocity of the rotor 14. With regard to the run parameters, these parameters may include run duration, set speed, set temperature, ramp up rate, ramp down rate, and the like. The run parameters may be entered via a control interface 24 by a user for example. The control interface 24 may include a user interface operable to receive inputs from the user.

In a typical run, the rotor 12 is accelerated to the set speed, maintained at the set speed for the run duration and decelerated until essentially stopped. During acceleration to the set speed, the rotor 12 gains kinetic energy ($KE_{rotor}$) as a function of the mass inertia multiplied by the angular velocity squared. A particular example of a suitable equation for determining the $KE_{rotor}$ may include:

$$KE_{rotor} = \frac{0.5 \times I_r \times S^2}{12} \qquad \text{Eqn 1}$$

Where: $KE_{rotor}$ is the kinetic energy in foot pounds (ft-lbs) at speed equals S in radians per second (rad/sec) for a rotor having an inertia mass of $I_r$ in inch pounds per second squared (in-lbs-sec$^2$).

In the event of a failure of the rotor 12, this accumulated $KE_{rotor}$ will drive the rotor 12, or pieces of the rotor 12 outward from the axis of rotation with possible undesirable consequences. In this regard, the centrifuge 10 includes a containment system 26. This containment system 26 is configured to contain and/or dissipate a predetermined amount of kinetic energy ($KE_{con}$). For example, the containment system 26 may include a tub having 2 cm steel sides, 6 cm steel bottom, and a 1.25 cm steel lid. In this manner, the containment system 26 may facilitate containing at least the $KE_{con}$. The $KE_{con}$ may be determined based on a plurality of factors such as, type or types of rotors available for the centrifuge 10, manufacturers specifications, empirical data, maximum speed and/or torque of the motor 14, and the like. According to an embodiment of the invention and as described herein, the centrifuge 10 is configured to substantially prevent the $KE_{rotor}$ from exceeding the $KE_{con}$.

Figure 2:
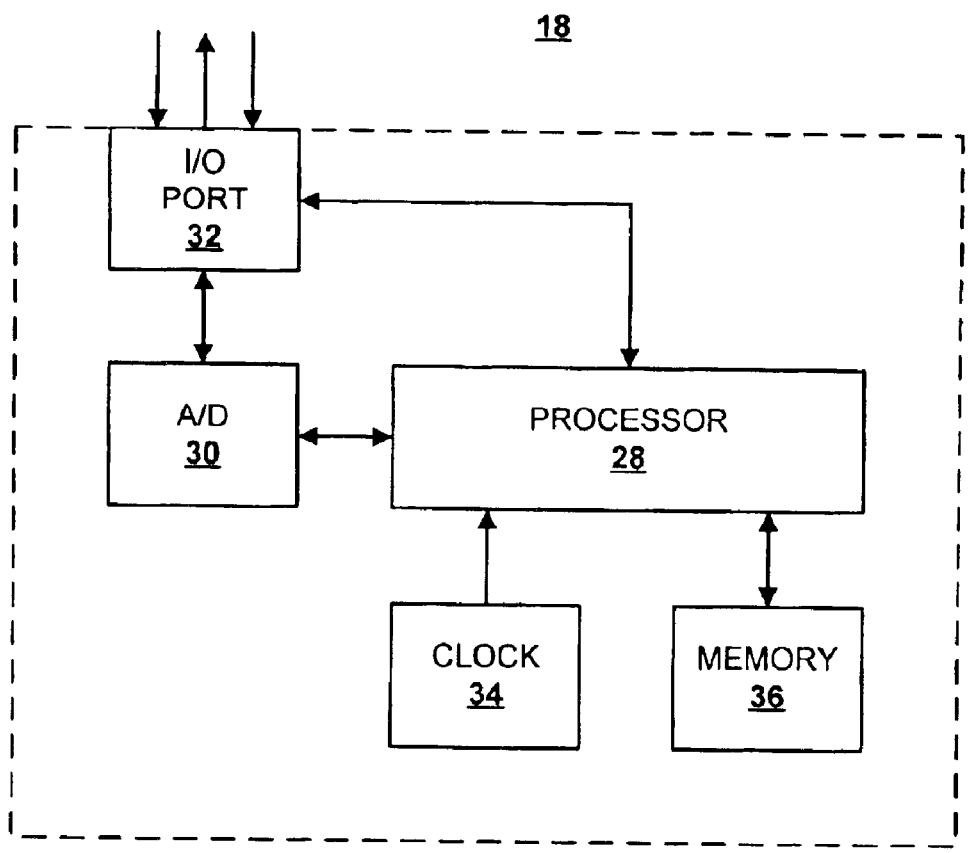
FIG. 2 is a block diagram of a controller for the centrifuge device of FIG. 1.

FIG. 2 is a block diagram of the controller 18. As shown in FIG. 2, the controller 18 includes a processor 28, analog to digital (A/D) converter 30, input/output (I/O) port 32, clock 34, and memory 36. The I/O port 32 is configured to receive signals from any suitably attached electronic device and forward these signals to the A/D converter 30 and/or the processor 28. For example, the I/O port 32 may receive signals associated with torque generated by the motor 14 and forward the signals to the processor 28. If the signals are in analog format, the signals may proceed via the A/D converter 30. In this regard, the A/D converter 30 is configured to receive analog format signals and convert these signals into corresponding digital format signals. Conversely, the A/D converter 30 is configured to receive digital format signals from the processor 28, convert these signals to analog format, and forward the analog signals to the I/O port 32. In this manner, electronic devices configured to receive analog signals may intercommunicate with the processor 28.

The processor 28 is configured to receive and transmit signals to and from the A/D converter 30 and/or the I/O port 32. The processor 28 is further configured to receive time signals from the clock 34. In addition, the processor 28 is configured to store and retrieve electronic data to and from the memory 36. Furthermore, the processor 28 is configured to determine signals operable to modulate the motor 14 and thereby control the rotor 12 to rotate at a particular rate. For example, signals associated with the speed of the rotor 12 may be forwarded by the speed sensor 22 and received by the processor 28. Based on the speed of the rotor 12, the processor 28 may determine modulations to pulse width signal that will facilitate the rotor 12 spinning at a particular rate, for example. Moreover, the processor 28 is configured to determine an acceleration rate for the rotor 14 ($R_a$) and deceleration rate for the rotor 14 ($R_d$). For example, while the motor 14 is applying sufficient torque to the rotor 12 to cause acceleration of the rotor 12, the acceleration rate of the rotor 12 may be determined by sensing a first speed of the rotor 12, waiting an increment of time, and sensing a second speed of the rotor 12. The difference between the first and the second speed of the rotor 12 divided by the increment of time may be determined to be the acceleration rate. Similarly, while the rotor 12 is spinning and the motor 14 is in an idle state, the deceleration rate of the rotor 12 may be determined by sensing a first speed of the rotor 12, waiting an increment of time, and sensing a second speed of the rotor 12. The difference between the first and the second speed of the rotor 12 divided by the increment of time may be determined to be the deceleration rate.

According to an embodiment of the invention, the processor 28 is configured to substantially prevent the $KE_{rotor}$ from exceeding $KE_{con}$. Generally, the greatest rotational velocity (speed) achieved by the rotor 12 during the run is essentially equal to the set speed. Consequently, the greatest $KE_{rotor}$ during the run typically occurs at the set speed. In this regard, the processor 28 is configured to determine the $KE_{rotor}$ at the set speed ($KE_{ss}$). If the $KE_{ss}$ is determined to exceed the $KE_{con}$, the processor 28 is configured to substantially prevent the rotor 12 from obtaining the set speed. For example, the processor 28 may reduce the set speed or stop the run. While a variety of suitable equations may be utilized to determine the $KE_{ss}$, a particular example of a suitable equation includes:

$$KE_{ss} = \frac{0.5(T_a - I_d(R_a + R_d))}{(R_a + R_d)S_s^2} \qquad \text{Eqn 2}$$

Where: $T_a$ is the torque applied by the motor 14; $I_d$ is the inertia of the drive train including some or all of the motor rotor, coupling, gyro shaft and drive cone; $R_a$ is the acceleration rate of the rotor 12; $R_d$ is the deceleration rate of the rotor 12; and $S_s$ is the set speed.

With regard to the $I_d$, this value may be empirically determined and stored to the memory 36, for example. With regard to the $T_a$, this value may be expressed in a variety of suitable manners such as total energy applied to the motor 14, inch pounds, and/or torque per applied amperage of current. In addition, the $T_a$ may be determined utilizing a variety of suitable equations such as:

$$T_a = Ke\left(\frac{PWM \times C_a}{1024} - 2\right) \qquad \text{Eqn 3}$$

Where: Ke is an empirically determined amount of torque per applied ampere of current, Ca is the applied current, and PWM is the pulse width modulation.

Figure 3:
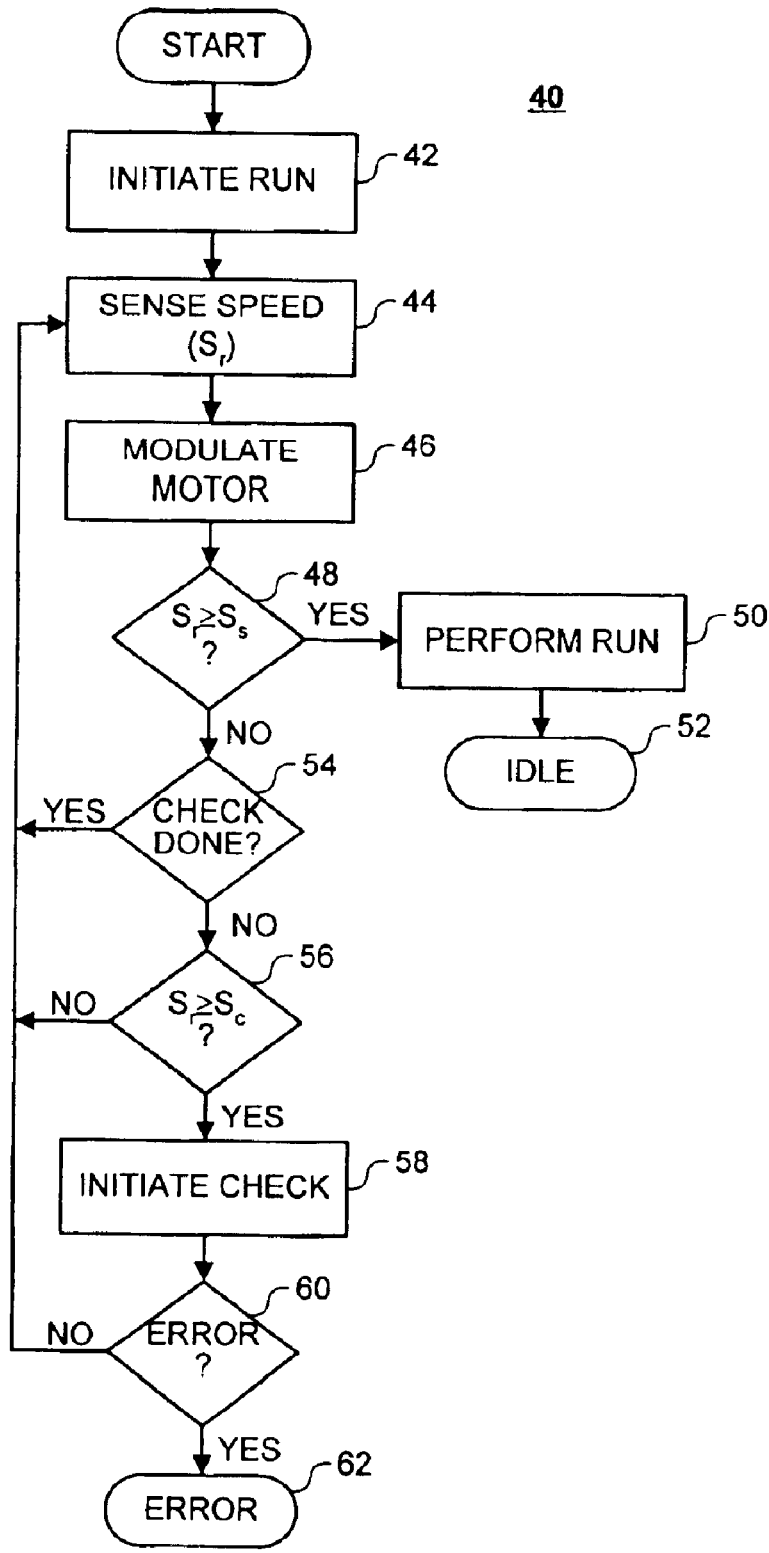
FIG. 3 is a flow diagram illustrating steps that may be followed in accordance with an embodiment of the method or process.

FIG. 3 is a flow diagram illustrating steps that may be followed in accordance with an embodiment of a method 40. Prior to initiation of the method 40, a great variety of pre-run steps may occur. These pre-run steps include, in no particular order: the centrifuge 10 may be turned on, run parameters may be entered, a set temperature may be achieved, the rotor 12 may be placed in the centrifuge 10, the containment system 26 may be secured, a set atmospheric pressure within the containment system may be achieved, a system check may be performed, and a start run command may be received. Following the pre-run steps, the run may be initiated at step 42.

At step 44, the speed of the rotor 12 ($S_{rotor}$) is sensed. For example, the speed sensor 22 may sense the rotational velocity of the motor 14, a drive shaft of the motor 14, the rotor 12, or the like. In this regard, as the rotor 12 is configured for attachment to the motor 14 via the drive train of the motor 14, it is within the scope of embodiments of the invention that the $S_{rotor}$ may be indirectly determined based on the rotational velocity of one or more components of the drive train of the motor 14. In addition, as the $S_{rotor}$ may be calculated based on signals utilized to control the motor 14, it is to be understood that the $S_{rotor}$ may be determined based on a calculated speed of the motor 14.

At step 46, the $S_{rotor}$ is modulated. For example, in response to receiving measurements associated with the $S_{rotor}$, the controller 18 may determine the $S_{rotor}$. In addition, the controller 18 may, in response to determining the $S_{rotor}$, determine signals associated with PWM and/or applied current and forward these signals to the drive electronics 16. The drive electronics 16 may, in turn, provide power to the motor 14 according to these signals. In this, or any other suitable manner, the $S_{rotor}$ may be modulated.

At step 48, it is determined if the rotor 12 has achieved the set speed ($S_s$). For example, the $S_{rotor}$ sensed at step 44 may be compared to the $S_s$. If the $S_{rotor}$ is essentially equal to or greater than the $S_s$, the run may be performed at step 50. If the $S_{rotor}$ is less than the $S_s$, it is determined, at step 54, if a check has been performed.

At step 50, the $S_{rotor}$ may be maintained at the $S_s$ for the duration of the run. Following the duration of the run, the rotor 12 may be allowed to slow and/or a breaking force in the form of torque opposite to the direction of rotation may be applied to the rotor 12 until the rotor 12 has essentially stopped rotating. Following the step 50, the centrifuge 10 may idle at step 52 until additional commands are received.

At step 54, it is determined whether the check has been performed. In this check, it is determined if the rotor 12 has achieved a check speed ($S_{check}$). With regard to the $S_{check}$, in order to facilitate preventing the $KE_{rotor}$ from exceeding the $KE_{con}$, the $S_{rotor}$ is determined at a speed at which essentially no rotor configured to function in the centrifuge would have acquired a $KE_{rotor}$ greater than the $KE_{con}$. Therefore, the $S_{check}$ may be determined to be any reasonable value from approximately zero revolutions per minute (rpm) to about the speed at which a rotor having a comparatively high inertia mass and configured to function in the centrifuge 10 would exceed the $KE_{con}$. To continue with the description of step 54, if the check has been performed, the $S_{rotor}$ may be sensed at step 44. If the check has not been performed, it may be determined at step 56 if the $S_{rotor}$ has achieved the $S_{check}$.

At step 56, it is determined whether the $S_{rotor}$ has achieved the $S_{check}$. For example, the $S_{rotor}$ may be compared to the $S_{check}$. If the $S_{rotor}$ is essentially equal to or greater than the $S_{check}$, the check may be initiated at step 58. If the $S_{rotor}$ is less than the $S_{check}$, the $S_{rotor}$ may be sensed again at step 44.

At step 58, the check is initiated. In an embodiment of the invention the check includes comparing the $KE_{ss}$ to the $KE_{con}$. The $KE_{con}$ is determined empirically and/or based upon the configuration of the containment system 26. The $KE_{con}$ may be stored to the memory 36 for access by the processor 28. The $KE_{ss}$ may be determined in any suitable manner. In a specific example, the $KE_{ss}$ may be determined utilizing Eqn. 2 and the $T_a$, the $I_d$, the $R_a$, the $R_d$, and the $S_s$ as illustrated herein.

At step 60, it is determined whether an error has been detected. For example, if it is determined, at step 58, that the $KE_{ss}$ is greater than the $KE_{con}$, an error mode may be initiated at step 62. If an error is not detected, the $S_s$ may be sensed at step 44.

According to various embodiments of the invention, at step 62 the run may be stopped or the $S_s$ may be reduced to a speed at which the $KE_{ss}$ does not exceed the $KE_{con}$. If the $S_s$ is reduced, it may be determined that there is not an error and thus, the run may continue. For example, the $S_s$ may be accessed from the memory 36, the $S_s$ may be suitable reduced and the modified $S_s$ may be stored to the memory 36. Following the reduction of the $S_s$, the $S_{rotor}$ may be sensed at step 44. In addition, an alarm configured to alert the user may be activated on the control interface 24.

Figure 4:
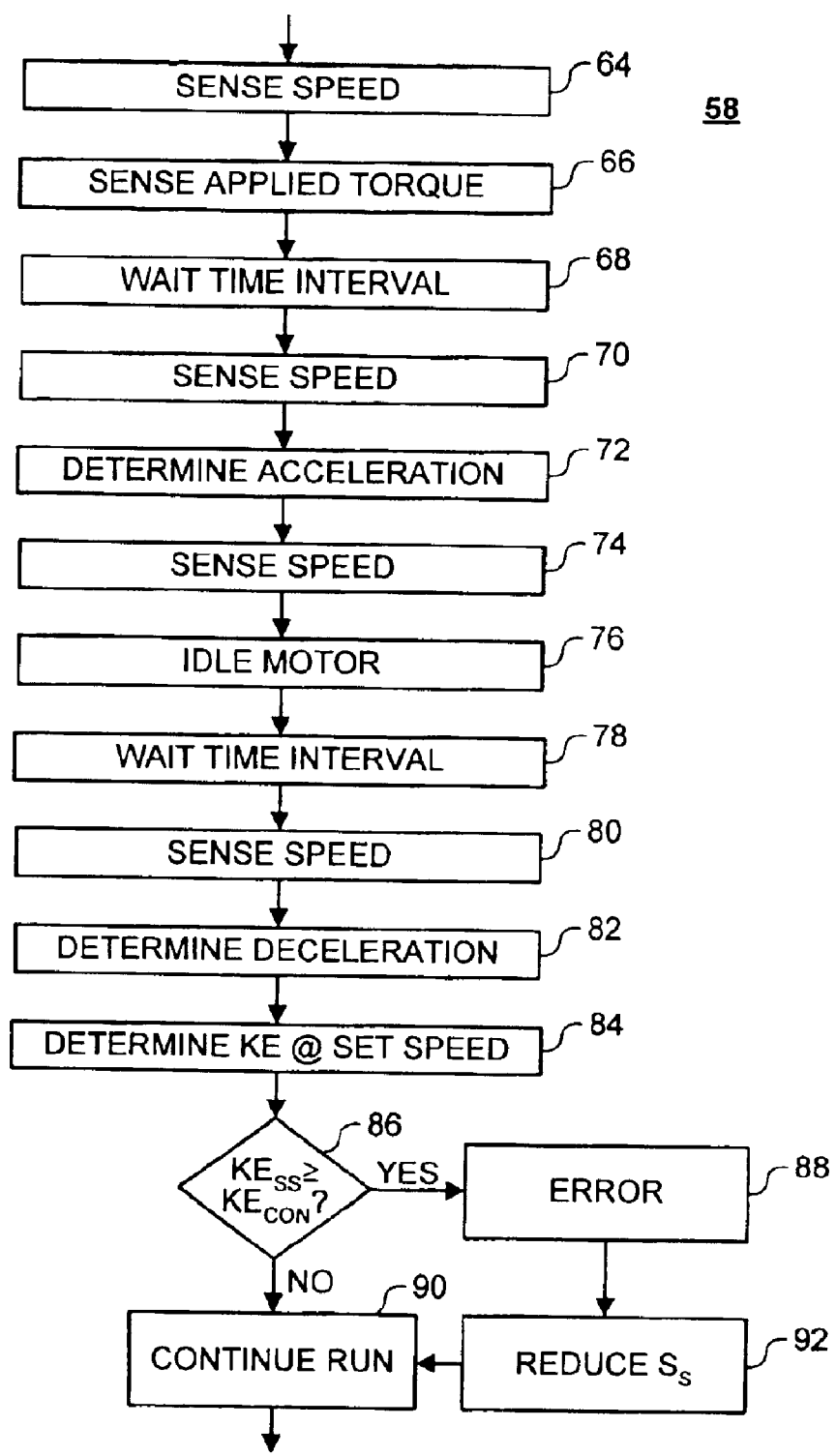
FIG. 4 is a flow diagram illustrating steps that may be followed in accordance with an embodiment of the method or process.

FIG. 4 is a flow diagram illustrating steps that may be followed in accordance with an embodiment of the step 58 as described in FIG. 3. As shown in FIG. 4, in the check procedure described in the step 58, the $R_a$ is determined at steps 64 to 72, the $R_d$ is determined at steps 74 to 82, and the $KE_{ss}$ is determined at step 84. While according to various embodiments of the invention, these values may be determined in a variety of suitable manners, in a specific example these values may be determined as follows.

At step 64, the $S_{rotor}$ is sensed as described at step 44. At step 66, the $T_a$ is sensed. For example, the torque sensor 20 may sense the $T_a$ and transmit measurements associated with the $T_a$ to the controller 18. In another example, the $T_a$ may be calculated in a manner similar to described herein with reference to Eqn 3. At step 68, a wait time interval may be allowed to elapse. For example, 55µ seconds may be allowed to elapse prior to sensing the $S_{rotor}$ again at step 70. At step 72, the $R_a$ is determined. For example, the $R_a$ may be calculated based on a difference in the $S_{rotor}$ sensed at steps 64 and 70. This speed difference, if present, divided by the wait time interval may be determined to be the $R_a$.

At step 74, the $S_{rotor}$ is sensed as described at step 44. At step 76, the motor 14 is controlled to idle. For example, the controller 18 may transmit signals configured to facilitate an essentially non-powered state in the motor 14. At step 78, a wait time interval may be allowed to elapse in a manner similar to the step 68. At step 80, following the elapse of time at step 78, the $S_{rotor}$ may be sensed again. At step 82, the $R_d$ is determined. For example, the $R_d$ may be calculated based on a difference in the $S_{rotor}$ sensed at steps 74 and 80. This speed difference, if present, divided by the wait time interval may be determined to be the $R_d$.

At step 84, the $KE_{ss}$, is determined. For example, utilizing Eqn. 2, the $KE_{ss}$ may be determined in response to determining the $R_a$ and the $R_d$.

At step 86, it is determined whether the $KE_{ss}$ exceeds the $KE_{con}$. If the $KE_{ss}$ is essentially equal to or greater than the $KE_{con}$, an error state may be initiated at step 88. If the $KE_{ss}$ is less than the $KE_{con}$, the run may be continued at step 90.

At step 88, an error state is initiated. For example, the control interface 24 may be controlled to display and/or sound an alarm operable to inform the user of an error. In addition, the run may be aborted. Alternatively, at step 92, the set speed ($S_s$) may be reduced to a speed at which the $KE_{ss}$ is below the $KE_{con}$. For example, if a reduction of 5% or less in the $S_s$ will facilitate the $KE_{ss}$ being below the $KE_{con}$, the $S_s$ may be reduced without greatly reducing the forces experienced by any samples present in the rotor 14. Furthermore, the duration of the run may be modified to compensate for the reduction in the $S_s$. For example, the duration of the run may be increased to compensate for a decrease in the $S_s$. Following the modification of the $S_s$, the run may be continued at step 90.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for controlling rotational speed of a rotor within a centrifuge, the system comprising:
    a motor operative to rotate the rotor;
    a modulation controller configured to modulate an amount of torque generated by the motor and thereby modulate the rotational speed of the rotor;
    a speed sensor configured to sense the rotational speed of at least one of the motor and the rotor, and transmit the sensed rotational speed to the controller; and
    wherein the controller is configured to determine an amount of kinetic energy associated with the rotor in response to the amount of torque and the sensed rotational speed, and is configured to compare the amount of kinetic energy associated with the rotor to a predetermined amount of kinetic energy, the controller being further configured to reduce the rotational speed of the motor in response to the compared amount of kinetic energy associated with the rotor being greater than the predetermined amount of kinetic energy.

2. The system according to claim 1, further comprising a torque sensor configured to sense the amount torque generated by the motor and transmit the sensed torque to the controller.

3. The system according to claim 1, wherein the controller is further configured to calculate the amount of torque applied to rotor by the motor in response to a predetermined motor torque characteristic and a measured amount of current applied to the motor.

4. The system according to claim 1, wherein the controller is further configured to compare the amount of kinetic energy associated with the rotor to the predetermined amount of kinetic energy while the rotor is spinning at a relatively slow speed, the relatively slow speed being below a speed sufficient to impart an amount of kinetic energy that is greater than the predetermined amount of kinetic energy.

5. The system according to claim 1, further comprising a timer configured to count a time increment and transmit the time increment to the controller, wherein the controller is further configured to determine an acceleration rate of the rotor based on a change in rotational speed during the time increment.

6. The system according to claim 5, wherein the controller is further configured to determine a deceleration rate in response to a change in rotational speed during an idle state of the motor for the time increment.

7. The system according to claim 1, wherein the controller is further configured to determine the amount of kinetic energy of the rotor at a relative maximum speed of the rotor during a run, the controller being further configured to compare the amount of kinetic energy of the rotor at the relative maximum speed to the predetermined amount of kinetic energy and the controller being configured to substantially prevent the rotor from obtaining the relative maximum speed in response to the amount of kinetic energy of the rotor at the relative maximum speed being relatively larger than the predetermined amount of kinetic energy.

8. An apparatus for substantially preventing kinetic energy of a rotor from exceeding a predetermined amount of kinetic energy, the apparatus comprising;
   means for determining a first kinetic energy of the rotor spinning at a first rotational velocity;
   means for determining whether the first kinetic energy exceeds the predetermined amount of kinetic energy; and
   means for modulating torque being applied to the rotor in response to the first kinetic energy exceeding the predetermined amount of kinetic energy, wherein the rotor is spun at a relatively slower rotational velocity than the first rotational velocity.

9. The apparatus according to claim 8, further comprising means for determining an acceleration rate of the rotor.

10. The apparatus according to claim 9, further comprising means for determining a deceleration rate of the rotor, wherein the first kinetic energy is determined based on the deceleration rate, the acceleration rate, the first rotational velocity and the torque being applied to the rotor.

11. The apparatus according to claim 8, further comprising means for determining the first kinetic energy prior to the rotor spinning at the first rotational velocity.

12. A method of substantially preventing kinetic energy of a rotor from exceeding a predetermined amount of kinetic energy, the method comprising;
   determining a first kinetic energy of the rotor spinning at a first rotational velocity;
   determining whether the first kinetic energy exceeds the predetermined amount of kinetic energy; and
   modulating torque applied to the rotor in response to the first kinetic energy exceeding the predetermined amount of kinetic energy wherein, the rotor is spun at a relatively slower rotational velocity than the first rotational velocity.

13. The method according to claim 12, further comprising determining an acceleration rate of the rotor.

14. The method according to claim 13, further comprising determining a deceleration rate of the rotor, wherein the first kinetic energy is determined based on the deceleration rate, the acceleration rate, the first rotational velocity and the torque being applied to the rotor.

15. The method according to claim 12, further comprising determining the first kinetic energy prior to the rotor spinning at the first rotational velocity.

* * * * *